United States Patent [19]

Rice

[11] Patent Number: 4,762,305
[45] Date of Patent: Aug. 9, 1988

[54] RAMMING MIX FOR FORMING A MULLITE-CORUNDUM LINING WITHIN A FOUNDRY FURNACE

[75] Inventor: Hal H. Rice, Birmingham, Mich.

[73] Assignee: General Motors Corporation, Detroit, Mich.

[21] Appl. No.: 70,146

[22] Filed: Jul. 2, 1987

Related U.S. Application Data

[63] Continuation of Ser. No. 881,596, Jul. 3, 1986, abandoned.

[51] Int. Cl.⁴ .............................................. C21C 5/44
[52] U.S. Cl. ..................................... 266/281; 264/30; 266/44; 501/127
[58] Field of Search ................... 266/280, 281, 44; 264/30; 501/127, 128, 129

[56] References Cited

U.S. PATENT DOCUMENTS

1,727,675  9/1929  Ross et al. ........................ 266/281
3,751,571  8/1973  Burrows ............................ 373/155

FOREIGN PATENT DOCUMENTS

0039764  3/1984  Japan ............................... 266/280
0452428  5/1975  U.S.S.R. ........................... 266/280

OTHER PUBLICATIONS

Landefeld, *Inductive Heating of Coreless Induction Furnace Linings* AES Transactions, pp. 197–204, vol. 78-67 (12/1978).
*Super Refractories*, p. 5, 12/58.

*Primary Examiner*—L. Dewayne Rutledge
*Assistant Examiner*—S. Kastler
*Attorney, Agent, or Firm*—Douglas D. Fekete

[57]  ABSTRACT

A foundry furnace lining is formed using an improved ramming mix composed predominantly of raw kyanite particles and alumina particles. The particulate mix is sintered to form a silica slag-resistant lining, which sintering is accompanied by reactions that produce compressive forces that strengthen the product lining.

2 Claims, No Drawings

RAMMING MIX FOR FORMING A MULLITE-CORUNDUM LINING WITHIN A FOUNDRY FURNACE

This is a continuation of application Ser. No. 881,596 filed on July 3, 1986, now abandoned.

BACKGROUND OF THE INVENTION

This invention relates to a refractory lining within a foundry furnace for containing an iron melt having a silica slag, which lining is composed of mullite and corundum to resist corrosion by the slag. More particularly, this invention relates to a method for forming the lining that includes sintering a ramming mix composed of raw kyanite particles and alumina particles and produces compressive forces during sintering that strengthen the product lining.

In a typical coreless induction foundry furnace containing iron melt, the melt compartment is lined by a continuous refractory material. The lining is formed by positioning an expendable steel liner within the furnace about the compartment, but spaced apart from the furnace wall. An aggregate of dry, unbonded refractory particles, referred to as a ramming mix, is packed into the space about the steel liner. Iron melt is introduced into the compartment, whereupon heat from the melt sinters the ramming mix to form the refractory lining, and the steel liner is dissolved.

The furnace lining is typically composed of cristobalite, derived from a silica-base ramming mix. Malleable iron melt has a silica-base slag which corrodes a silica lining so that replacement is necessary. Refractory materials such as mullite or alumina resist attack by silica slag, but heretofore linings formed from ramming mixes of these materials have not developed sufficient sintered strength and tend to crack during use.

Therefore, it is an object of this invention to provide a method for forming a corrosion-resistant, crack-resistant mullite-corundum lining within a foundry furnace, such as a coreless induction furnace for containing malleable iron, which method employs an improved ramming mix comprising kyanite and alumina particles. The ramming mix is sinterable to produce a lining composed substantially of mullite and corundum to resist attack by silica slag. Furthermore, the ramming mix is formulated to develop significant compressive forces in the packed body during sintering that strengthen the product lining to prevent cracking. As a result, the useful life of the lining is extended.

SUMMARY OF THE INVENTION

In accordance with a preferred embodiment of this invention, a foundry furnace lining is formed using an improved ramming mix that is composed predominantly of raw kyanite particles and alumina particles. The raw kyanite and alumina particles preferably comprise at least 95 weight percent of the ramming mix. The proportion of raw kyanite particles is between about 35 and 60 weight percent of the ramming mix. The balance comprises sintering aids such as titania, fluorspar, magnesium fluoride and cryolite and contains at most a minor quantity of free silica particles.

To form a lining, the preferred ramming mix is packed about an expendable steel liner in a foundry furnace and heated by iron melt poured into the furnace to a temperature greater than 1500° C. As the ramming mix is heated, the kyanite, $3Al_2O_3 \cdot 3SiO_2$, dissociates to form mullite, $3Al_2O_3 \cdot 2SiO_2$, and silica, $SiO_2$, in accordance with the following reaction:

The nascent free silica may form an intermediate cristobalite phase, but eventually reacts with the alumina, $Al_2O_3$, to form additional mullite, as follows:

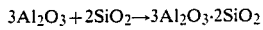

Free silica particles present in the ramming mix formulation react similarly with the excess alumina. Thus, the product lining is composed of mullite and, in addition, corundum derived from unreacted alumina, but contains substantially no free silica. These reactions are accompanied by a tendency for the material to expand. However, the material is constrained by the expendable liner and the iron melt. This produces residual compressive stresses in the material during sintering, particularly at the melt contact surface formed adjacent the liner. These residual forces improve interparticle bonding during sintering and thus strengthen the product lining.

The ramming mix of this invention is particularly well suited for use in a coreless induction furnace containing a malleable iron melt having an acidic silica slag. The product mullitecorundum lining contains little or no free silica and, therefore, resists attack by the slag. Further, the sintered lining is strengthened as a result of the compressive forces developed during sintering to prevent cracking. Accordingly, the useful life of the lining produced by this invention is significantly extended.

DETAILED DESCRIPTION OF THE INVENTION

A preferred formula for preparing ramming mixes for use in this invention is set forth in Table I.

TABLE I

| PREFERRED RAMMING MIX COMPOSITION | |
|---|---|
| Constituent | Parts by Weight |
| Coarse raw kyanite particles | 40–60 |
| Fine raw kyanite particles | 0–10 |
| Coarse raw alumina particles | 25–45 |
| Fine alumina particles | 0–7 |
| Ultrafine alumina particles | 6–24 |
| Silica particles | 0–10 |
| Titania powder | 0–2.2 |
| Fluorspar powder | 0.08–0.2 |
| Magnesium fluoride powder | 0.12–0.3 |
| Cryolite powder | 0.08–0.2 |

Specific examples of preferred ramming mixes are set forth in Table II.

TABLE II

| | RAMMING MIX COMPOSITIONS | | | | | |
|---|---|---|---|---|---|---|
| | Mix A | Mix B | Mix C | Mix D | Mix E | Mix F |
| Raw kyanite #1 | 46.5 | — | 60.0 | — | 50.0 | 60.0 |
| Raw kyanite #2 | — | 46.7 | — | 60.0 | — | — |
| Raw kyanite #3 | — | — | — | — | 10.0 | — |
| Alumina #1 | 21.7 | 20.6 | 15.0 | 20.6 | 21.8 | 26.0 |
| Alumina #2 | 21.8 | 20.6 | 15.0 | 20.6 | 15.0 | — |
| Alumina #3 | — | — | — | — | — | 8.8 |
| Alumina #4 | — | 6.8 | — | 6.8 | — | — |
| Alumina #5 | — | — | — | — | — | 2.0 |
| Alumina #6 | 24.0 | 10.0 | 24.0 | 10.0 | 8.0 | 6.0 |

TABLE II-continued

| RAMMING MIX COMPOSITIONS | | | | | | |
|---|---|---|---|---|---|---|
| | Mix A | Mix B | Mix C | Mix D | Mix E | Mix F |
| Silica | 2.4 | — | 2.4 | — | 2.4 | 2.4 |
| Titania | 0.64 | 1.6 | 0.64 | 1.6 | 0.64 | 0.64 |
| Calcium fluoride | 0.1 | 0.2 | 0.1 | 0.2 | 0.1 | 0.08 |
| Magnesium fluoride | 0.12 | 0.3 | 0.12 | 0.3 | 0.12 | 0.12 |
| Cryolite | 0.1 | 0.2 | 0.1 | 0.2 | 0.1 | 0.08 |
| Total, parts by weight | 117.36 | 107.0 | 117.36 | 120.3 | 108.16 | 106.12 |

Mixtures of particles of varying sizes are preferred to enhance packing of the mix into a dense body for sintering. By raw kyanite, it is meant kyanite that has not been calcined, which would prematurely transform the kyanite to mullite. Raw kyanite #1 is a commercial material having a grade designated 35 mesh, by which is meant that the kyanite is ground so that the bulk of the particles pass through a 35 mesh screen. Raw kyanite #2 is also a commercial 35 mesh grade, but has a relatively larger average particle size. In contrast to these coarse grade materials, raw kyanite #3 is a finer, 100 mesh grade. Alumina #1 is coarse commercial tabular material graded 6 mesh. Alumina #2 is a commercial tabular material sized to between 8 and 14 mesh. Alumina #3 is a commercial tabular material designated 28 mesh grade. Alumina #4 is a commercial 100-mesh grade tabular material, and is significantly finer than tabular alumina #1 through #3. Alumina #5 is a crushed fused material ground to a nominal 90 mesh grade. Alumina #6 is an ultrafine material sized to −325 mesh. The silica particles are predominantly 200 mesh or finer. The titania, calcium fluoride, magnesium fluoride and cryolite were added as fine powder.

In accordance with a preferred embodiment of this invention, the ramming mix is employed to replace a worn refractory liner in a production coreless induction furnace that is employed for melting malleable iron. While the furnace is empty, the worn lining is removed, exposing an underlying wall. A steel liner is positioned within the furnace spaced from the wall. The ramming mix is filled into the space about the steel liner, using vibration to obtain a dense packing. Iron melt is poured into the steel liner, dissolves the liner and sinters the ramming mix into a product refractory liner.

Sintered specimens were prepared by heating the mixes in Table II to 1565° C., corresponding approximately to the sintering temperature produced by a malleable iron melt. The specimens produced by Mixes A through E consisted substantially of mullite and corundum. The product of Mix F was similarly composed of mullite and corundum, but also contained a trace amount of cristobalite. Corrosion was evaluated by contact with a silica slag of the type associated with malleable iron melt. All products exhibited satisfactory resistance to corrosion, with the product of Mix A being considered superior.

A feature of the ramming mixes of this invention is a tendency to expand significantly when heated to iron melt-sintering temperatures effective to dissociate kyanite and form mullite. Dimensional change during heating was determined using a dilatometer marketed by Harrop Industries, Inc. under the trade designation TDA-H1. The dilatometer measures dimensional change as a function of temperature for a sample that is subjected to a load of about 38 kiloPascals. The specimens were heated to a temperature of about 1565° C., the approximate in-furnace sintering temperature. The measured dilatometric expansion for the ramming mixes is shown in Table III and ranged between 5.0 and 7.7 percent.

TABLE III

| RAMMING MIX PROPERTIES | | | | | | |
|---|---|---|---|---|---|---|
| | Mix A | Mix B | Mix C | Mix D | Mix E | Mix F |
| Weight percent kyanite particles | 40 | 44 | 51 | 50 | 56 | 57 |
| Weight percent alumina particles | 58 | 54 | 46 | 48 | 41 | 40 |
| Percent dilatometric expansion heated to 1565° C. | 5.7 | 7.0 | 6.0 | 7.7 | 5.4 | 5.0 |
| Total alumina (as percent $Al_2O_3$) | 80 | 79 | 75 | 77 | 73 | 72 |
| Total silica (as percent $SiO_2$) | 18 | 17 | 22 | 20 | 24 | 25 |

Table III also summarizes the compositions for Mixes A through F. The table shows the weight percentage of kyanite particles and alumina particles in each mix. Since kyanite is composed of alumina and silica, the overall concentration of alumina in the ramming mix, and thus the product lining, is greater than the proportion of alumina particles in the ramming mix. Overall concentrations for alumina and silica calculated as $Al_2O_3$ and $SiO_2$, respectively, are also reported.

In an alternate embodiment, ramming mixes for forming a mullite-corundum furnace lining as described herein were prepared containing fused alumina, as opposed to tabular alumina in Mixes A through F. Mixes G and H are described in Table IV and comprise raw kyanite #1, alumina #6, silica and sintering aids as described in Mixes A through F. The fused alumina had been sized as indicated. That is, "Fused alumina, −5 +12 mesh" is composed of particles that pass through a 5 mesh screen but collect upon a 12 mesh screen.

TABLE IV

| KYANITE-FUSED ALUMINA RAMMING MIXES | | |
|---|---|---|
| | Mix G | Mix H |
| Raw kyanite #1 | 46.7 | 60.0 |
| Alumina #6 | 8.0 | 24.0 |
| Silica | 2.4 | 2.4 |
| Cryolite | 0.23 | 0.23 |
| Calcium fluoride | 0.17 | 0.17 |
| Magnesium fluoride | 0.25 | 0.25 |
| Fused alumina, −5 + 12 mesh | 13.05 | 9.51 |
| Fused alumina, −12 + 20 mesh | 21.87 | 15.92 |
| Fused alumina, −20 + 40 mesh | 3.13 | 2.28 |
| Fused alumina, −40 + 60 mesh | 1.29 | 0.93 |
| Fused alumina, −60 + 80 mesh | 0.70 | 0.50 |
| Fused alumina, −80 + 100 mesh | 0.36 | 0.18 |
| Fused alumina, −100 + 200 mesh | 3.76 | 0.35 |
| Fused alumina, −200 + 325 mesh | 3.81 | 0.33 |
| Total | 105.72 | 117.05 |

The sintered products produced by Mixes G and H exhibited superior slag resistance. Table V summarizes the proportion of kyanite particles and alumina particles for Mixes G and H and lists the dilatometric expansion when heated to an effective iron melt-sintering temperature.

TABLE V
RAMMING MIX PROPERTIES

|  | Mix G | Mix H |
|---|---|---|
| Weight percent kyanite particles | 44 | 51 |
| Weight percent alumina particles | 53 | 46 |
| Percent dilatometric expansion heated to 1565° C. | 6.0 | 6.8 |

In forming a lining in accordance with this invention, the ramming mix is packed between an expendable steel lining and an outer furnace wall. The packed body is thus constrained, rather than being free to expand. When a molten iron charge is introduced into the furnace to sinter the ramming mix to form the product lining, the raw kyanite transforms to mullite, releasing free silica, which reacts with free alumina to form additional mullite. As used herein, free alumina and free silica refer to alumina, $Al_2O_3$, and silica, $SiO_2$, that are not combined in an identifiable form such as kyanite or mullite. These reactions would tend to cause an unconstrained material to expand. However, since the material is constrained, compressive forces develop that enhance the sintering process so as to strengthen the product lining. The strengthened lining resists cracking during use in an induction furnace.

In general, it is desired that the ramming mix exhibit a dilatometric expansion when heated to 1565° C. under a 38 kPa load of at least 5 percent in order to develop sufficient compressive forces within the lining during sintering. A preferred growth range is between 5 and 8 percent. It is believed that a minimum of about 35 weight percent raw kyanite particles in the ramming mix is suitable to achieve at least 5 percent dilatometric growth. The balance of the ramming mix is principally alumina particles so that the combination of raw kyanite particles and alumina particles preferably forms at least 95 weight percent of the ramming mix. In addition, it is desired that the raw kyanite particles not form more than about 60 weight percent of the ramming mix to provide an excess of alumina sufficient to assure reaction with the silica released by the kyanite. The ramming mix also preferably contains sintering aids such as titania, fluorspar, magnesium fluoride and cryolite. Although some free silica may be added to the ramming mix and may form a transient cristobalite phase during sintering, and thereby may increase the dilatometric expansive properties of the mix, it is desired that the alumina be sufficient to react with any added free silica to form mullite in the product lining.

The product lining is formed substantially of mullite phase, derived from the transformation of the kyanite and reaction between free silica and free alumina, and the corundum phase, formed by sintering of excess alumina. Preferably, the weight proportion of alumina, calculated as $Al_2O_3$, to silica, calculated as $SiO_2$, in the product lining is less than 4.2. The corundum and mullite phase resist attach by the silica-base slag that is typically found on malleable iron melt.

While this invention has been described in terms of certain embodiments thereof, it is not intended that it be limited to the above description but rather only to the extent set forth in the claims that follow.

The embodiments of the invention in which an exclusive property or privilege is claimed are defined as follows:

1. In a method for forming a refractory lining within a foundry furnace for defining a compartment for containing an iron melt, said method comprising positioning an expandable iron metal liner within said furance to define the compartment, packing a dry, refractory, particulate ramming mix into a space about the metal liner, and filling the compartment with an iron melt, whereupon the melt dissolves the iron liner and heats the refractory ramming mix to sinter the mix to form the refractory lining, the improvement wherein the ramming mix comprises a mixture composed predominantly of raw kyanite particles and alumina particles, said kyanite particles being present in an amount between about 35 and 60 weight percent of the ramming mix and dissociating during sintering to form mullite and silica, said alumina particles being present in an amount sufficient to react during sintering with free silica to form additional mullite, said ramming mix being formulated to develop a dilametric expansion at sintering temperature under 38 kPa load of at least five percent, whereupon constraint of said ramming mix by said liner during sintering produces compressive forces that strengthen the product lining, said sintered lining being substantially formed of mullite and corundum phases and resistant to attack by silica-base slag.

2. In a method for forming a sintered refractory lining within a foundry furnace for defining a compartment for containing an iron melt, said method comprising positioning an expandable iron metal liner within said furnace to define the comaprtment, packing a dry, refractory, particulate ramming into a space about the metal liner, and filling compartment with an iron melt, whereupon the melt dissolves the iron liner and heats the ramming mix to sinter mix to form the refractory lining, the improvement wherein the ramming mix comprises a mixture of raw kyanite particles and alumina particles in an amount equal to at least 95 weight percent of the ramming mix, said kyanite particles being present in an amount between about 35 and 60 weight percent of the ramming mix and dissociating during sintering to form mullite and silica, said alumina particles being present in an amount sufficient to produce a weight proportion of alumina to silica in the mix of less than 4.6 and reacting during sintering with silica to form additional mullite, said ramming mix being characterized by dimensional expansion of at least 5 percent during sintering of a body while subjected to a 38 kPa load and effective to produce compressive forces in the packed ramming mix during sintering that strengthen the product lining, said sintered lining being substantially formed of mullite and corundum phases and resistant to attack by silica-base slag.

* * * * *